(12) United States Patent
Molholm et al.

(10) Patent No.: US 11,776,091 B1
(45) Date of Patent: Oct. 3, 2023

(54) METHOD AND DEVICE FOR GENERATING A HIGH-DYNAMIC RANGE (HDR) IMAGE

(71) Applicant: Apple Inc., Cupertino, CA (US)

(72) Inventors: Robert K. Molholm, Scotts Valley, CA (US); Ricardo J. Motta, Palo Alto, CA (US)

(73) Assignee: APPLE INC., Cupertino, CA (US)

(*) Notice: Subject to any disclaimer, the term of this patent is extended or adjusted under 35 U.S.C. 154(b) by 379 days.

(21) Appl. No.: 16/906,449

(22) Filed: Jun. 19, 2020

Related U.S. Application Data

(60) Provisional application No. 62/904,936, filed on Sep. 24, 2019.

(51) Int. Cl.
| | |
|---|---|
| *G06T 5/00* | (2006.01) |
| *G06T 5/50* | (2006.01) |
| *G06N 3/08* | (2023.01) |
| *G06N 3/045* | (2023.01) |

(52) U.S. Cl.
CPC ............. *G06T 5/002* (2013.01); *G06N 3/045* (2023.01); *G06N 3/08* (2013.01); *G06T 5/003* (2013.01); *G06T 5/009* (2013.01); *G06T 5/50* (2013.01); *G06T 2207/10016* (2013.01); *G06T 2207/10144* (2013.01); *G06T 2207/20081* (2013.01); *G06T 2207/20084* (2013.01); *G06T 2207/20201* (2013.01); *G06T 2207/20212* (2013.01)

(58) Field of Classification Search
CPC ......... G06T 5/002; G06N 3/0454; G06N 3/08; G06T 5/003; G06T 5/009; G06T 5/50; G06T 2207/10016; G06T 2207/10144; G06T 2207/20081; G06T 2207/20084; G06T 2207/20201; G06T 2207/20212
See application file for complete search history.

(56) References Cited

U.S. PATENT DOCUMENTS

| | | | | |
|---|---|---|---|---|
| 11,403,740 | B2* | 8/2022 | Lin | .................. H04N 5/23219 |
| 2020/0068151 | A1* | 2/2020 | Pourreza Shahri et al. ................ H04N 5/2356 |
| 2020/0265567 | A1* | 8/2020 | Hu et al. | ............. G06N 3/0454 |
| 2020/0394772 | A1* | 12/2020 | Afra | ........................ G06N 3/08 |
| 2021/0073957 | A1* | 3/2021 | Slabaugh et al. | ...... H04N 9/735 |
| 2021/0195086 | A1* | 6/2021 | Baba et al. | .......... G06V 40/166 |

OTHER PUBLICATIONS

Lee et al., ["Deep Chain HDRI: Reconstructing a High Dynamic Range Image from a Single Low Dynamic Range Image"], Sep. 10, 2018. (Year: 2018).*

* cited by examiner

*Primary Examiner* — Phuoc Tran
(74) *Attorney, Agent, or Firm* — Fernando & Partners, LLP

(57) ABSTRACT

In one implementation, a method includes obtaining an image. The method includes generating a plurality of denoised images by denoising the image using a respective plurality of denoisers, wherein the plurality of denoisers includes a first denoiser associated with a first level of exposure and a second denoiser associated with a second level of exposure. The method includes generating a combined image by combining the plurality of denoised images.

18 Claims, 8 Drawing Sheets

METHOD AND DEVICE FOR GENERATING A HIGH-DYNAMIC RANGE (HDR) IMAGE

CROSS REFERENCE TO RELATED APPLICATIONS

This application claims priority to U.S. Provisional Pat. App. No. 62/904936, filed on Sep. 24, 2019, which is hereby incorporated by reference in its entirety.

TECHNICAL FIELD

The present disclosure relates generally to image processing, and in particular, to generating a high-dynamic range (HDR) image.

BACKGROUND

A high-dynamic range (HDR) image has a greater dynamic range than particular devices are capable of producing. Generating an HDR image without noise or other distortion in the extremes of the dynamic range can be a difficult and/or time-consuming process.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
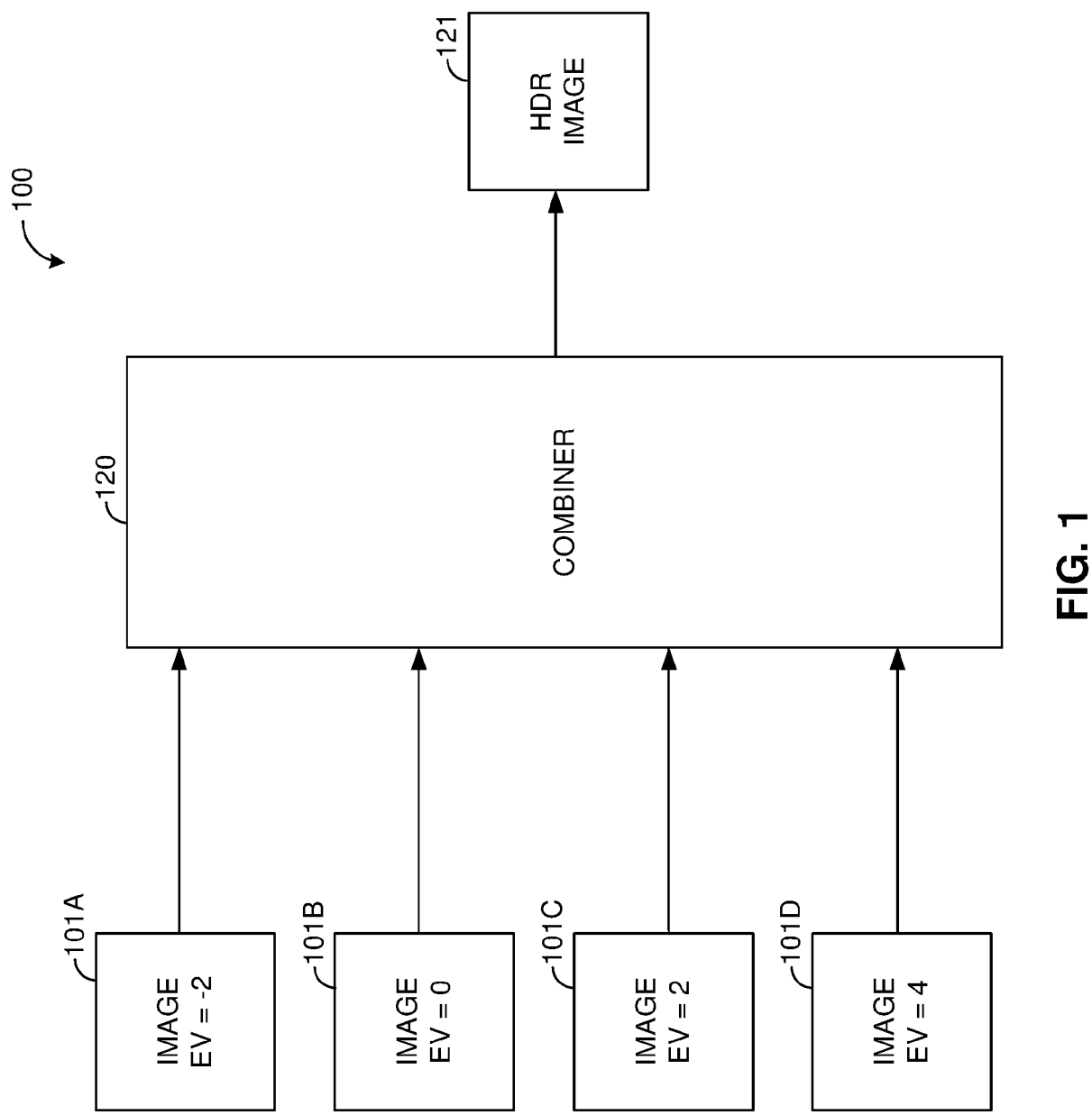
FIG. 1 is a functional block diagram of an HDR image generator that generates an HDR image using a plurality of images having different levels of exposure.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE IMPLEMENTATIONS

FIG. 1 is a functional block diagram of a first HDR image generator 100. The first HDR image generator 100 receives a plurality of images 101A-101D of a scene with different levels of exposure.

In various implementations, the different levels of exposure correspond to different camera exposure values settings (e.g., different combinations of gains and exposure times used to capture the plurality of images). In various implementations, the different levels of exposure correspond to different luminous exposures (e.g., different amounts of light captured in the plurality of images, which depends on the camera exposure value settings and the scene luminance).

In various implementations, each of the plurality of images is taken at a different exposure value. In various implementations, the exposure value is an absolute exposure value, a function of the camera exposure value settings (e.g., an f-number and an exposure time). Thus, in various implementations, an image taken at an exposure value of 5 is taken with an f-number of 2.0 and an exposure time of 1/15 of a second. In various implementations, the exposure value is a relative exposure value, a function of the luminous exposure, where an exposure value of 0 corresponds to that recommended by the light level and the ISO speed, even though the absolute exposure value may be -2, 0, 2, 4, 6, etc. Thus, in various implementations, an image taken at an exposure value of 0 corresponds to a "correctly exposed" image as determined by an auto-exposure algorithm, whereas an image taken at an exposure value of -2 corresponds to an under-exposed image and an image taken at an exposure value of 2 corresponds to an over-exposed image.

It is to be appreciated that the particular exposure values (and noise values) disclosed herein are merely examples and that any exposure value (or noise value) or set of exposure values (and/or noise values) may be used in any implementation set forth below.

For example, in FIG. 1, the first HDR image generator 100 receives a first image 101A of a scene taken at an exposure value of -2 and having an ultra-low level of exposure, a second image 101B of the scene taken at an exposure value of 0 and having a low level of exposure, a third image 101C of the scene taken at an exposure value of 2 and having a medium level of exposure, and a fourth image 101D of the scene taken at an exposure value of 4 and having a high level of exposure. Each of the plurality of images 101A-101D includes an M×N matrix of pixels having respective pixel values.

The plurality of images 101A-101D are fed into a combiner 120 that combines the plurality of images 101A-101D to generate a high-dynamic range (HDR) image 121. The HDR image 121 includes an M×N matrix of pixels having respective pixel values. In various implementations, the HDR image 121 is a weighted blend of plurality of images 101A-101D.

In various implementations, the combiner 120 performs exposure compensation on the plurality of images 101A-101D to a particular level of exposure, e.g. each of the plurality of images 101A-101D is brightened or darkened to match the particular level of exposure. In various implementations, the combiner 120 generates the respective pixel values of the HDR image 121 as a weighted blend of the corresponding pixel values of the plurality of exposure compensated images. In various implementations, the combiner 120 generates the respective pixel values of the HDR image 121 by determining the median of the corresponding pixel values of the plurality of exposure compensated images.

In various implementations, the plurality of images 101A-101D are captured sequentially with a camera set to different exposure values. Accordingly, obtaining the plurality of images 101A-101D is time-consuming as compared to capturing a single image. Further, the camera may move between capturing successive images requiring alignment of the plurality of images 101A-101D before they are combined by the combiner 120. Further, the scene may change between capturing successive images introducing noise, motion blur, and/or other artifacts to the HDR image 121.

In various implementations, an HDR image is generated based on a plurality of denoised images. The plurality of denoised images are generated by denoising the image using a respective plurality of denoisers associated with different levels of exposure. Thus, the plurality of denoisers includes a first denoiser associated with a first level of exposure and a second denoiser associated with a second level of exposure.

Figure 2A:
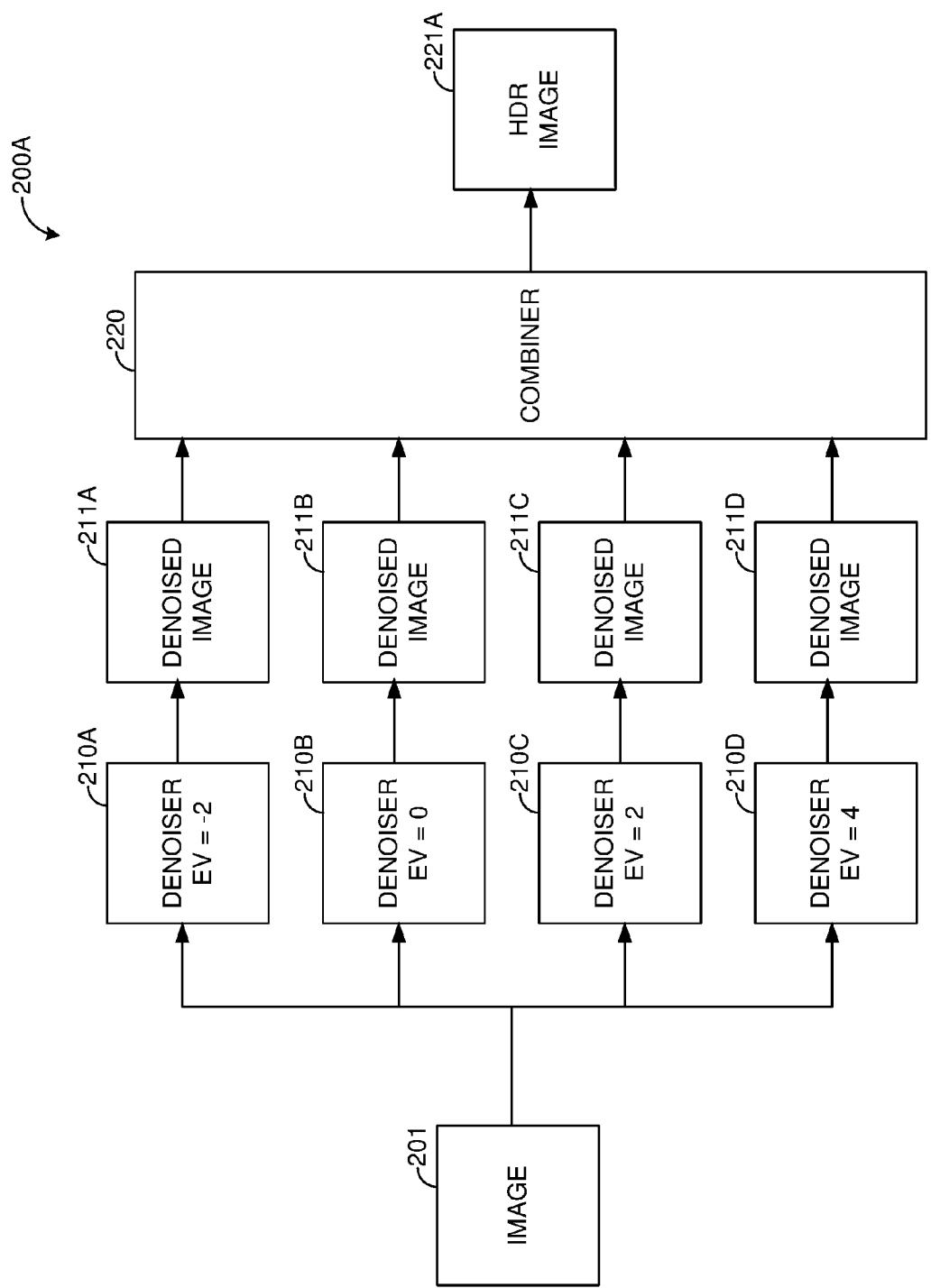
FIG. 2A is a functional block diagram of an HDR image generator that generates an HDR image using a single image and a plurality of denoisers associated with different levels of exposure.

FIG. 2A is a functional block diagram of an HDR image generator 200A that generates an HDR image 221A using a single image and a plurality of denoisers 210A-210D associated with different levels of exposure. The HDR image generator 200A receives an image 201 of a scene with a particular level of exposure. The image 201 includes an M×N matrix of pixels having respective pixel values.

Thus, whereas the HDR image generator 100 of FIG. 1 generates an HDR image 121 from a plurality of images 101A-101D with different levels of exposure, the HDR image generator 200A of FIG. 2A generates an HDR image 221A from a single image 201 having a particular level of exposure.

The image 201 is fed into a plurality of denoisers 210A-210D to generate a plurality of denoised images 211A-211D. The plurality of denoisers 210A-210D are respectively associated with a plurality of levels of exposure. In various implementations, the plurality of denoisers 210A-210D each apply a denoising algorithm associated with the respective level of exposure to generate a denoised image.

In various implementations, each of the plurality of denoisers 210A-210D includes a neural network trained on training data including images having the respective level of exposure as the output vectors and noisy versions of the images as the input vectors. In various implementations, the neural network includes an interconnected group of nodes. In various implementations, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the neural network is trained on the training data to set the weights.

In various implementations, the neural network includes a deep learning neural network. Accordingly, in some implementations, the neural network includes a plurality of layers (of nodes) between an input layer (of nodes) and an output layer (of nodes). In various implementations, the neural network receives, as an input, a noisy image. In various implementations, the neural network provides, as an output, a denoised version of the image.

Accordingly, in various implementations, the plurality of denoisers 210A-210D includes a first denoiser 210A that includes a first neural network trained on images taken at an exposure value of -2 and having an ultra-low level of exposure, a second denoiser 210B that includes a second neural network trained on images taken at an exposure value of 0 and having a low level of exposure, a third denoiser 210C that includes a third neural network trained on images taken at an exposure value of 2 and having a medium level of exposure, and a fourth denoiser 210D that includes a fourth neural network trained on images taken at an exposure value of 4 and having a high level of exposure.

In various implementations, the plurality of denoisers 210A-210D includes a first denoiser 210A that includes a first neural network trained on images taken at an exposure value of -2 and having an under-exposed level of exposure, a second denoiser 210B that includes a second neural network trained on images taken at an exposure value of 0 and having a correct level of exposure, a third denoiser 210C that includes a third neural network trained on images taken at an exposure value of 2 and having an over-exposed level of exposure, and a fourth denoiser 210D that includes a fourth neural network trained on images taken at an exposure value of 4 and having a highly over-exposed level of exposure.

The plurality of denoised images 211A-211D are fed into a combiner 220 that combines the plurality of denoised images 211A-211D to generate a high-dynamic range (HDR) image 221A. The HDR image 221A includes an M×N matrix of pixels having respective pixel values. In various implementations, the HDR image 221A is a weighted blend of plurality of images 211A-211D.

In various implementations, the combiner 220 performs exposure compensation on the plurality of denoised images 211A-211D to the particular level of exposure of the original image 201, e.g. each of the plurality of denoised images 211A-211D is brightened or darkened to match the particular level of exposure. In various implementations, the combiner 220 generates the respective pixel values of the HDR image 221A as a weighted blend of the corresponding pixel values of the plurality of exposure compensated images. In various implementations, the combiner 220 generates the respective pixel values of the HDR image 221A by determining the median of the corresponding pixel values of the plurality of exposure compensated images.

Thus, the combiner 220 combines various versions of the image 201, each with a different amount of gain, to generate an HDR image 221A with noise-free shadow detail and highlight detail.

In various implementations, an HDR image generator includes plurality of denoisers that, in addition to being associated with different levels of exposure, are associated with different levels of noise.

Figure 2B:
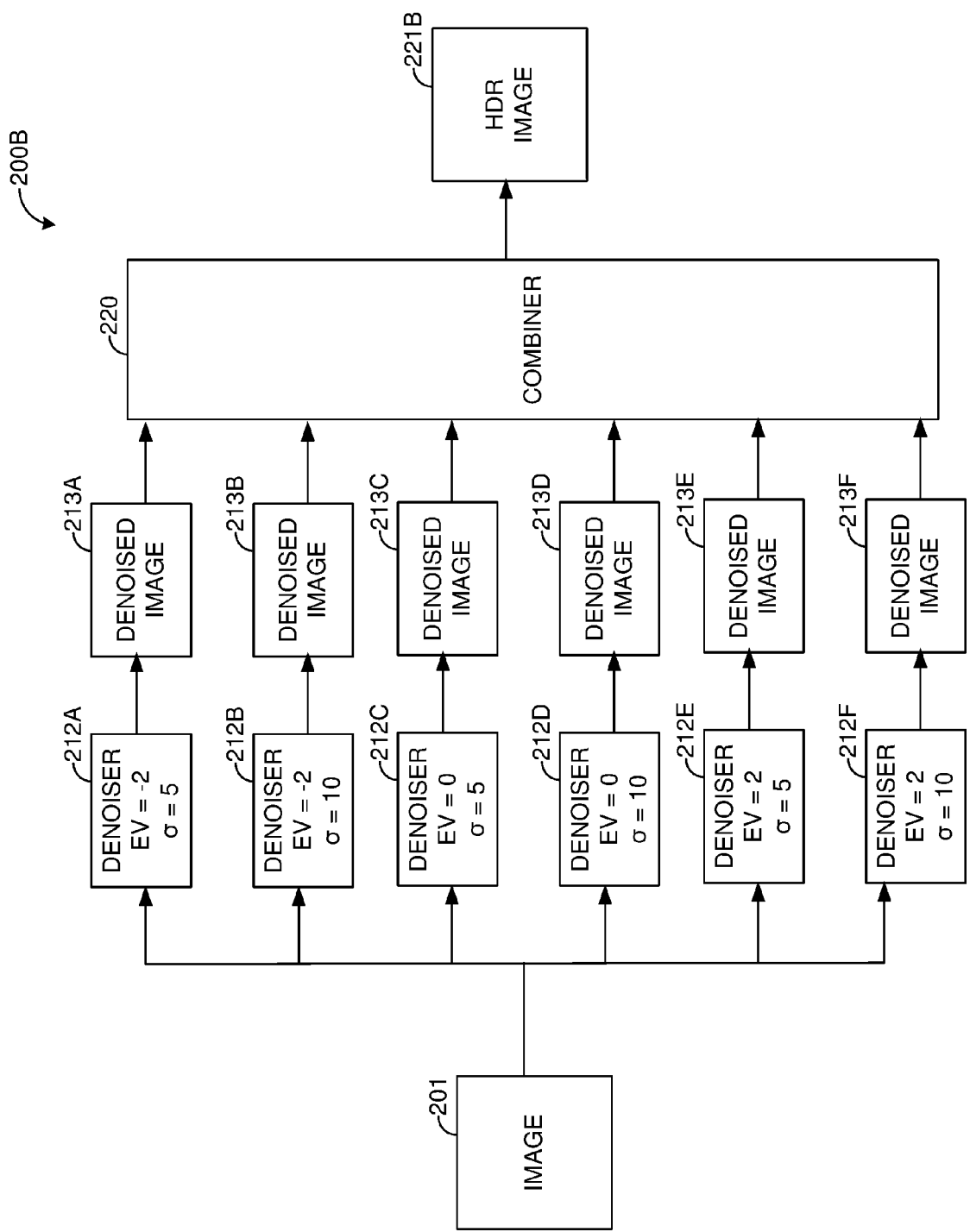
FIG. 2B is a functional block diagram of an HDR image generator that generates an HDR image using a single image and a plurality of denoisers associated with different levels of exposure and different levels of noise.

FIG. 2B is a functional block diagram of an HDR image generator 200B that generates an HDR image 221B using a single image and a plurality of denoisers 212A-212F associated with different levels of exposure and different levels of noise. The HDR image generator 200B receives an image 201 of a scene with a particular level of exposure. The image 201 includes an M×N matrix of pixels having respective pixel values.

The image 201 is fed into a plurality of denoisers 212A-212F to generate a plurality of denoised images 213A-213F. The plurality of denoisers 212A-212F are respectively associated with a plurality of levels of exposure and a plurality of levels of noise. In various implementations, the plurality of denoisers 212A-212F each apply a denoising algorithm associated with the respective level of exposure and respective level of noise to generate a denoised image.

In various implementations, each of the plurality of denoisers 212A-212F includes a neural network trained on training data including images having the respective level of exposure as the output vectors and noisy versions of the images having the respective level of noise as the input vectors. Thus, in various implementations, the neural network receives, as an input, a noisy image. In various implementations, the neural network provides, as an output, a denoised version of the image.

Accordingly, in various implementations, the plurality of denoisers 212A-212F includes a first denoiser 212A that includes a first neural network trained on images taken at an exposure value of -2 (having an ultra-low level of exposure or an under-exposed level of exposure) and having a noise value of 5, a second denoiser 212B that includes a second neural network trained on images taken at an exposure value of -2 and having a noise value of 10, a third denoiser 212C that includes a third neural network trained on images taken at an exposure value of 0 (having a low level of exposure of a correct level of exposure) and having a noise value of 5, a fourth denoiser 212D that includes a fourth neural network trained on images taken at an exposure value of 0 and having a noise value of 10, a fifth denoiser 212E that includes a fifth neural network trained on images taken at an exposure value of 2 (having a medium level or exposure or an over-exposed level of exposure) and having a noise value of 5, and a sixth denoiser 212F that includes a sixth neural network trained on images taken at an exposure value of 2 and having a noise value of 10.

Thus, the plurality of denoisers 212A-212F includes a set of denoisers associated with different levels of exposure and the same level of noise (e.g., a set including the first denoiser 212A, the third denoiser 212C, and the fifth denoiser 212E or a set including the second denoiser 212B, the fourth denoiser 212D, and the sixth denoiser 212F). The plurality of denoisers 212A-212F includes a set of denoisers associated with the same level of exposure and different levels of noise (e.g., a set including the first denoiser 212A and the second denoiser 212B, a set including the third denoiser 212C and the fourth denoiser 212D, or a set including the fifth denoiser 212E and the sixth denoiser 212F).

The plurality of denoised images 213A-213F are fed into a combiner 220 that combines the plurality of denoised images 213A-213F to generate a high-dynamic range (HDR) image 221B. The HDR image 221B includes an M×N matrix of pixels having respective pixel values. In various implementations, the HDR image 221B is a weighted blend of plurality of images 213A-213F.

In various implementations, the combiner 220 performs exposure compensation on the plurality of denoised images 213A-213F to the particular level of exposure of the original image 201, e.g. each of the plurality of denoised images 213A-213F is brightened or darkened to match the particular level of exposure. In various implementations, the combiner 220 generates the respective pixel values of the HDR image 221B as a weighted blend of the corresponding pixel values of the plurality of exposure compensated images. In various implementations, the combiner 220 generates the respective pixel values of the HDR image 221B by determining the median of the corresponding pixel values of the plurality of exposure compensated images.

In some circumstances, the dynamic range of the scene may be too high to preserve the highlight detail. Accordingly, as described below with respect to FIGS. 3A-3C, in various implementations, in addition to various versions of the image 201, the combiner 220 combines a supplemental image with a very short exposure time to recover extreme highlight detail. In particular, in various implementations, the combiner 220 combines the plurality of denoised images 213A-213F and one or more supplemental images.

Figure 3A:
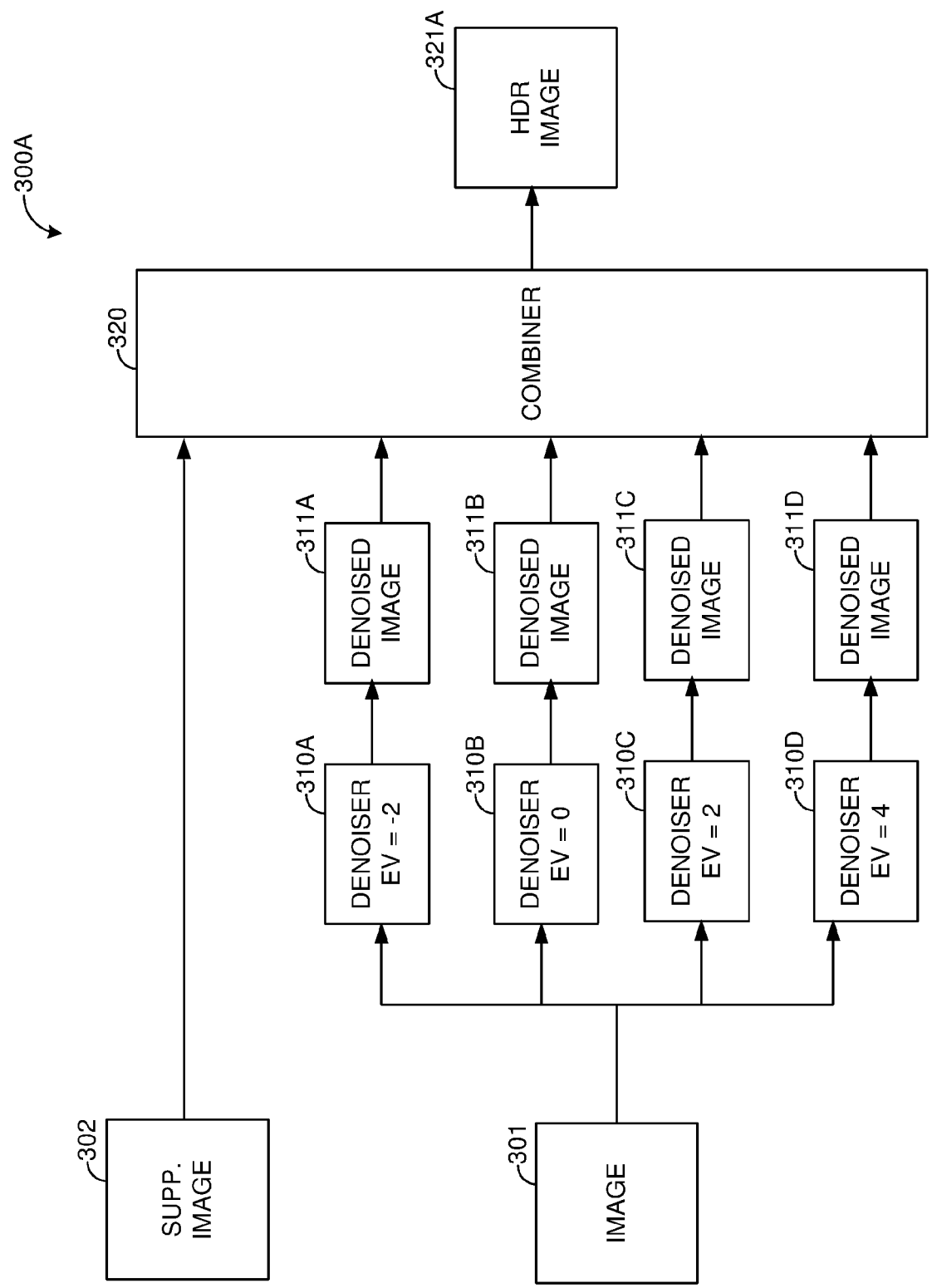
FIG. 3A is a functional block diagram of an HDR image generator that generates an HDR image using an image, a plurality of denoisers associated with different levels of exposure, and a supplemental image.

FIG. 3A is a functional block diagram of an HDR image generator 300A that generates an HDR image 321A using an image 301, a plurality of denoisers 310A-310D associated with different levels of exposure, and a supplemental image 301. The HDR image generator 300A receives an image 301 of a scene with a particular level of exposure, e.g., an exposure value of 0. The image 301 includes an M×N matrix of pixels having respective pixel values. The HDR image generator 300A receives a supplemental image 302 of the scene with a different level of exposure, e.g., a lower level of exposure, such as an image taken at an exposure value of -2.

Thus, whereas the HDR image generator 100 of FIG. 1 generates an HDR image 121 from a plurality of images 101A-101D with different levels of exposure and the HDR image generator 200A of FIG. 2 generates an HDR image 221A from a single image 201 having a particular level of exposure, the HDR image generator 300A of FIG. 3A generates an HDR image 321A from two images 301, 302, one having an ultra-low level of exposure and including highlight details.

The image 301 is fed into a plurality of denoisers 310A-310D to generate a plurality of denoised images 311A-311D. The plurality of denoisers 310A-310D are respectively associated with a respective level of exposure. In various implementations, the plurality of denoisers 310A-310D each apply a denoising algorithm associated with the respective level of exposure to generate a denoised image.

In FIG. 3A, the plurality of denoisers 310A-310D include a first denoiser 310A associated with an exposure value of -2, a second denoiser 310B associated with an exposure value of 0, a third denoiser 310C associated with an exposure value of 2, and a fourth denoiser 310D associated with an exposure value of 4.

In various implementations, each of the plurality of denoisers 310A-310D includes a neural network trained on training data including images having the respective level of exposure as the output vectors and noisy versions of the images as the input vectors. In various implementations, in addition to the plurality of denoisers 310A-310D being respectively associated with a plurality of levels of exposure, the plurality of denoisers 310A-310D are respectively associated with a plurality of levels of noise. Accordingly, in various implementations, the HDR image generator 300A includes a first denoiser that includes a first neural network trained on images having a low level of exposure and a low noise level, a second denoiser that includes a second neural network trained on images having a low level of exposure and a high noise level, a third denoiser that includes a third neural network trained on images having a high level of exposure and a low noise level, and a fourth denoiser that includes a fourth neural network trained on images having a high level of exposure and a high noise level.

The plurality of denoised images 311A-311D and the supplemental image 302 are fed into a combiner 320 which combines the plurality of denoised images 311A-311D and the supplemental image 302 to generate a high-dynamic range (HDR) image 321.

Although, in various implementations, the supplemental image 302 is an ultra-low exposure image including highlight details, in various implementations, the supplemental image 302 is an ultra-high exposure image including extreme shadow detail. In various implementations, both an ultra-low exposure image and an ultra-high exposure image are combined with the plurality of denoised images 311A-311D to generate the HDR image 321. In various implementations, any number of supplemental images with any levels of exposure can be combined with the plurality of denoised images.

In various implementations, the plurality of denoisers 310A-310D are associated with different levels of exposure based on the particular level of exposure of the image 301 and the different level of exposure of the supplemental image 302.

Figure 3B:
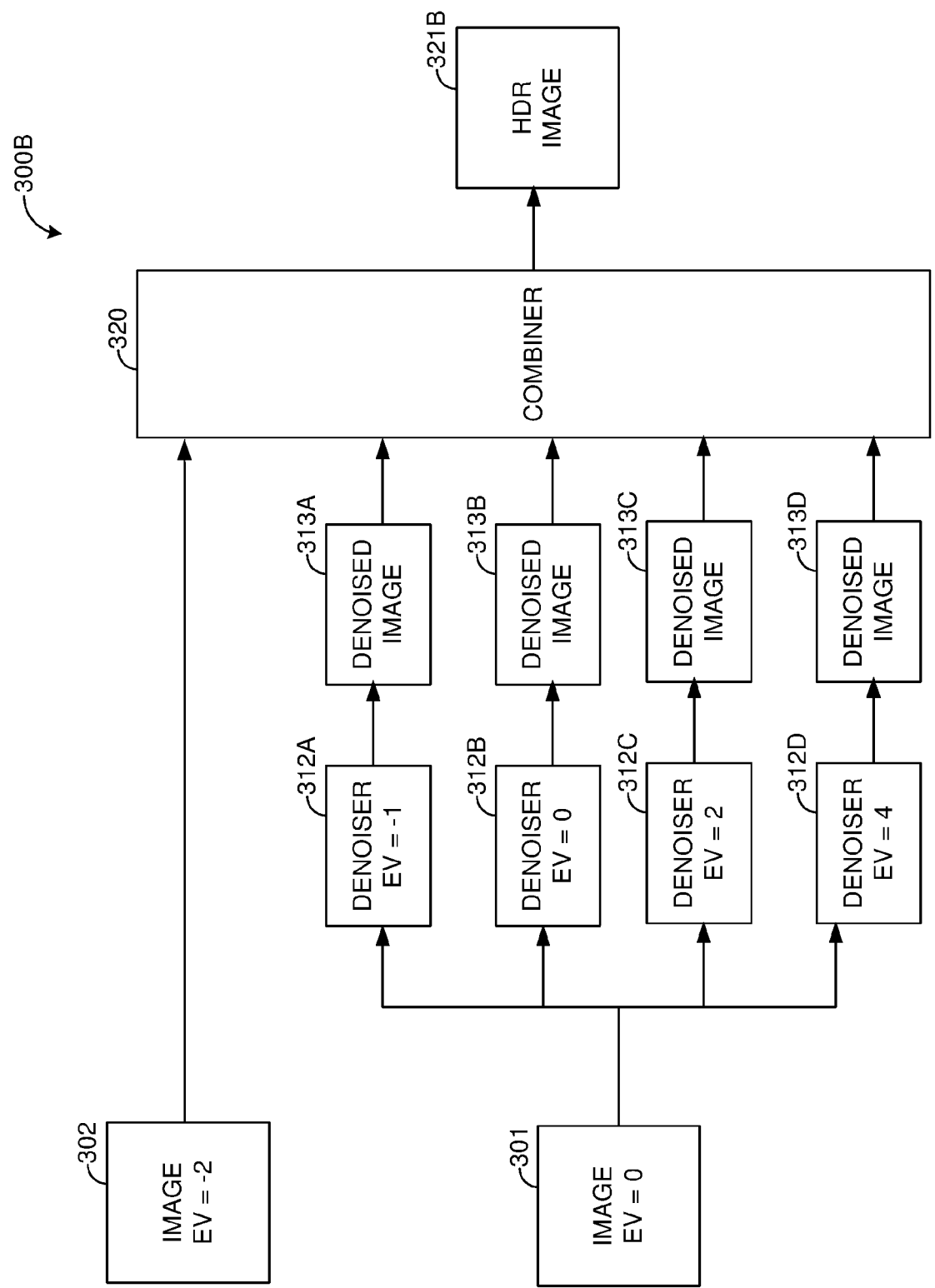
FIG. 3B is a functional block diagram of an HDR image generator that generates an HDR image using a first image having a first level of exposure, a second image having a second level of exposure, and a plurality of denoisers associated with different levels of exposure based on the first level of exposure and the second level of exposure applied to the first image.

FIG. 3B is a functional block diagram of an HDR image generator 300B that generates an HDR image using a first image having a first level of exposure, a second image having a second level of exposure, and a plurality of denoisers associated with different levels of exposure based on the first level of exposure and the second level of exposure applied to the first image.

The HDR image generator 300B receives an image 301 of a scene with a first level of exposure, e.g., an exposure value of 0. The image 301 includes an M×N matrix of pixels having respective pixel values. The HDR image generator 300B receives a supplemental image 302 of the scene with a second level of exposure, e.g. an exposure vale of -2.

The image 301 is fed into a plurality of denoisers 312A-312D to generate a plurality of denoised images 313A-313D. The plurality of denoisers 310A-310D are respectively associated with a respective level of exposure. In various implementations, the plurality of denoisers 310A-310D each apply a denoising algorithm associated with the respective level of exposure to generate a denoised image.

In FIG. 3B, the plurality of denoisers 312A-312D include a first denoiser 312A associated with an exposure value of -1, a second denoiser 312B associated with an exposure value of 0, a third denoiser 312C associated with an exposure value of 2, and a fourth denoiser 312D associated with an exposure value of 4.

In various implementations, the respective levels of exposure are dynamically determined based on the first level of exposure and the second level of exposure. In various implementations, the plurality of denoisers 312A-312D includes a denoiser associated with a level of exposure matching the first level of exposure of the image 301. For example, the HDR image generator 300B includes the second denoiser 312B associated with an exposure value of 0, that being equal to the exposure value of the supplemental image 302.

In various implementations, the plurality of denoiser 312A-312D does not include a denoiser associated with a level of exposure matching the second level of exposure of the supplemental image 302. For example, whereas the HDR image generator 300A of FIG. 3A includes a first denoiser 310A associated with an exposure value of -2, the HDR image generator 300B of FIG. 3B does not include a denoiser associated with an exposure value of -2, that being equal to the exposure value of the supplemental image 302.

The plurality of denoised images 313A-313D and the supplemental image 302 are fed into a combiner 320 which combines the plurality of denoised images 313A-313D and the supplemental image 302 to generate a high-dynamic range (HDR) image 321B.

In various implementations, a plurality of supplemental images are generated from a single supplemental image in the same manner as the denoised images 313A-313D, e.g., using a plurality of denoisers respectively associated with different levels of exposure and/or different levels of noise.

Figure 3C:
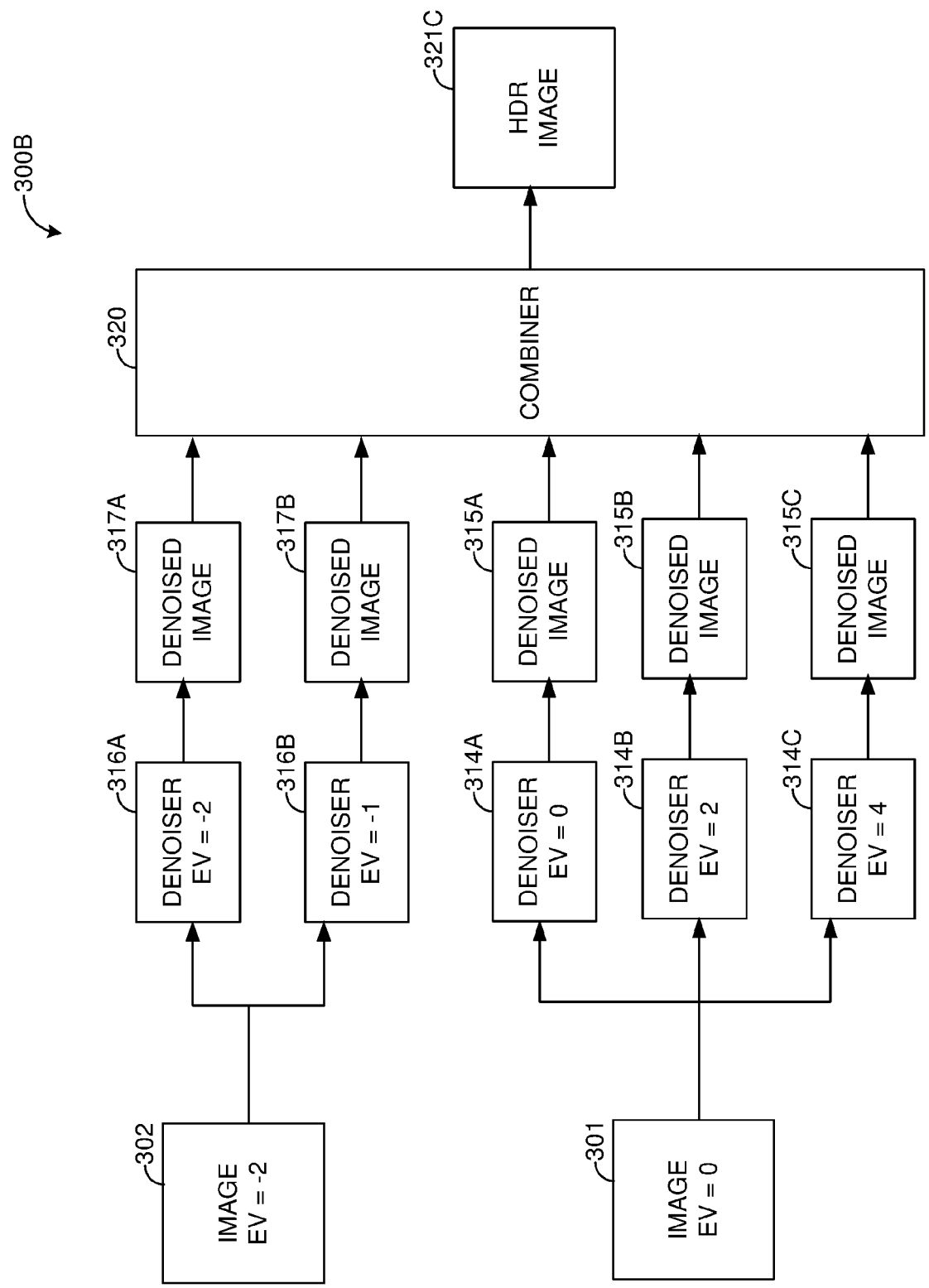
FIG. 3C is a functional block diagram of an HDR image generator that generates an HDR image based on a first image, a second image, and plurality of denoisers associated with different levels of exposure applied to the first image and the second image.

FIG. 3C is a functional block diagram of an HDR image generator that generates an HDR image based on a first image, a second image, and plurality of denoisers associated with different levels of exposure applied to the first image and the second image.

The HDR image generator 300C receives an image 301 of a scene with a first level of exposure, e.g., an exposure value of 0. The image 301 includes an M×N matrix of pixels having respective pixel values. The HDR image generator 300C receives a supplemental image 302 of the scene with a second level of exposure, e.g. an exposure value of -2.

The image 301 is fed into a first plurality of denoisers 314A-314C to generate a first plurality of denoised images 315A-315C. The first plurality of denoisers 314A-314C are respectively associated with a respective level of exposure.

In FIG. 3C, the first plurality of denoisers 314A-314C include a first denoiser 314A associated with an exposure value of 0, a second denoiser 314B associated with an exposure value of 2, and a third denoiser 314C associated with an exposure value of 4.

The supplemental image 302 is fed into a second plurality of denoisers 316A-316B to generate a second plurality of denoised images 317A-317B. The second plurality of denoisers 316A-316B are respectively associated with a respective level of exposure.

In FIG. 3C, the second plurality of denoisers 316A-316B include a fourth denoiser 316A associated with an exposure value of -2 and a fifth denoiser 316B associated with an exposure value of -1.

In various implementations, the respective levels of exposure are dynamically determined based on the first level of exposure and the second level of exposure. In various implementations, the first plurality of denoisers 314A-314B includes a denoiser associated with a level of exposure matching the first level of exposure of the image 301 and the second plurality of denoisers 316A-316B includes a denoiser associated with a level of exposure matching the second level of exposure of the supplemental image 302.

In various implementations, the first plurality of denoisers 314A-314C does not include a denoiser associated with a level of exposure matching the second level of exposure of the supplemental image 302 and the second plurality of denoisers 316A-316B does not includes a denoiser associated with a level of exposure matching the first level of exposure of the image 301.

The first plurality of denoised images 315A-315C and the second plurality of denoised images 317A-317B are fed into a combiner 320 which combines the first plurality of denoised images 315A-315C and the second plurality of denoised images 317A-317B to generate a high-dynamic range (HDR) image 321C.

Figure 4:
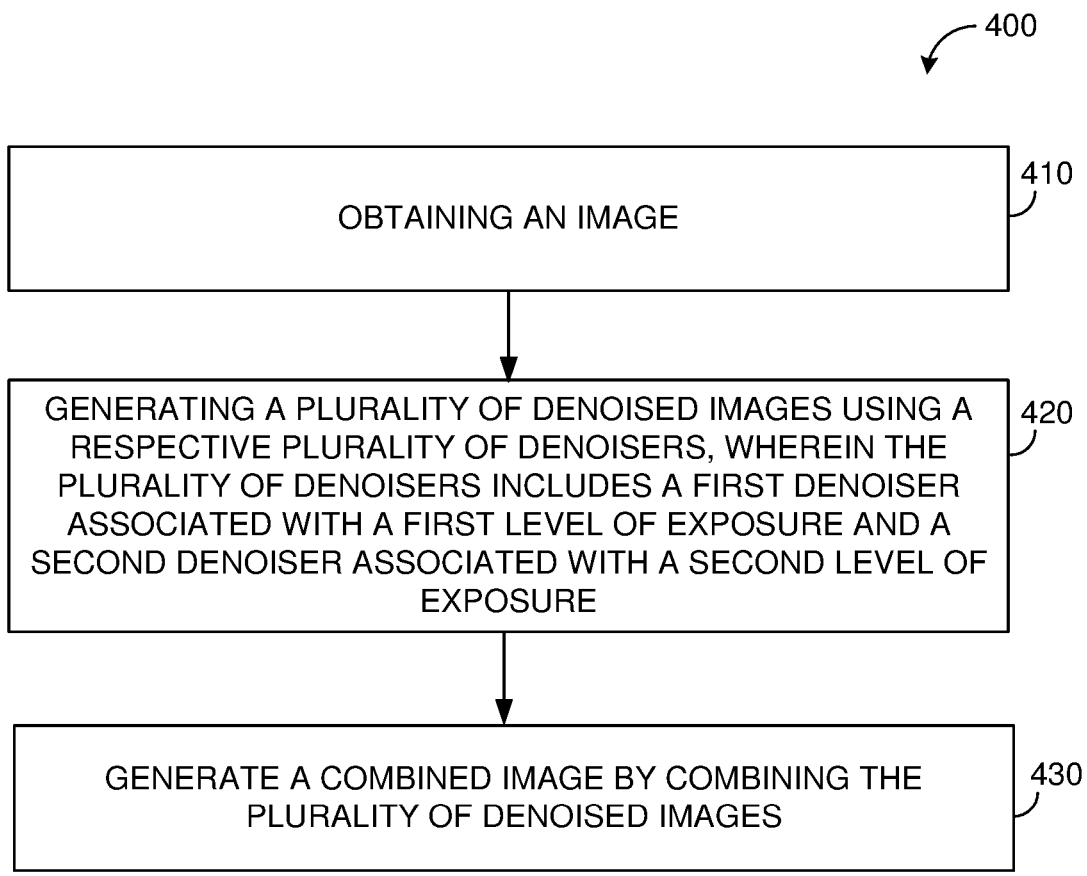
FIG. 4 is a flowchart representation of a method of generating an HDR image.

FIG. 4 is a flowchart representation of a method 400 of generating a high-dynamic range (HDR) image in accordance with some implementations. In some implementations, the method 400 is performed by an electronic device including a general processor. In some implementations, the method 400 is performed by processing logic, including hardware, firmware, software, or a combination thereof. In some implementations, the method 400 is performed by a processor executing code stored in a non-transitory computer-readable medium (e.g., a memory).

The method 400 begins, at block 410, with obtaining an image. In various implementations, the image is obtained using a camera. In various implementations, the image is obtained from memory. Because various implementations of the method 400 generate an HDR image from a single image, the method 400 can be performed on each of a plurality of frames of video to generate an HDR video. Accordingly, in various implementations, the image is a frame of video. Because various implementations of the method 400 generate an HDR image from a single image, the method 400 can be performed on an image including motion blur. Accordingly, in various implementations, the image includes motion blur.

The method 400 continues, at block 420, with generating a plurality of denoised images using a respective plurality of denoisers, wherein the plurality of denoisers includes a first denoiser associated with a first level of exposure and a second denoiser associated with a second level of exposure.

For example, in FIG. 2A, the HDR image generator 200A includes the first denoiser 210A associated with an exposure value of -2 and the second denoiser 210B associated with an exposure value of 0.

In various implementations, each of the plurality of denoisers implements a neural network trained on training data including, as the output, images having a particular level of exposure and, as the input, noisy versions of those images. Thus, in various implementations, the first denoiser includes a first neural network trained on training data including images having the first level of exposure and the second denoiser includes a second neural network trained on training data including images having the second level of exposure.

In various implementations, different denoisers are trained on training data in which the input images have different levels of noise. Thus, as an example, in various implementations, the plurality of denoisers includes a first denoiser associated with a first level of exposure and a first level of noise, a second denoiser associated with a second level of exposure and the first level of noise, a third denoiser associated with the first level of exposure and a second level of noise, and a fourth denoiser associated with the second level of exposure and a second level of noise.

For example, in FIG. 2B, the HDR image generator 200B includes the first denoiser 212A associated with an exposure value of -2 and a noise value of 5, the second denoiser 212B associated with an exposure value of -2 and a noise value of 10, the third denoiser 212C associated with an exposure value of 0 and a noise value of 5, and the fourth denoiser 212D associated with an exposure value of 0 and a noise value of 10.

Thus, in various implementations, the first denoiser is associated with the first level of exposure and a first level of noise and the plurality of denoisers includes a third denoiser associated with the first level of exposure and a second level of noise. Further, in various implementations, the first denoiser includes a first neural network trained on training data including images having the first level of exposure and the first level of noise and the third denoiser includes a second neural network trained on training data including images having the first level of exposure and the second level of noise.

The method 400 continues, in block 430, with generating a combined image by combining the plurality of denoised images. In various implementations, generating the combined image includes performing exposure compensation on the plurality of denoised images. In various implementations, generating the combined image includes generating a weighted blend of plurality of denoised images.

In various implementations, generating the combined image includes combining the plurality of denoised image and one or more supplemental images, such as an image captured with a short exposure time to ensure highlight detail is captured.

For example, in FIG. 3A, the HDR image generator 300A includes the combiner 320 that combines the plurality of denoised images 311A-311D and the supplemental image 302 to generate the HDR image 321A.

In various implementations, the combined image is a high-dynamic range (HDR) image. In various implementations, the method 400 produces, from a single image, an HDR image with noise-free shadow detail and highlight detail.

Figure 5:
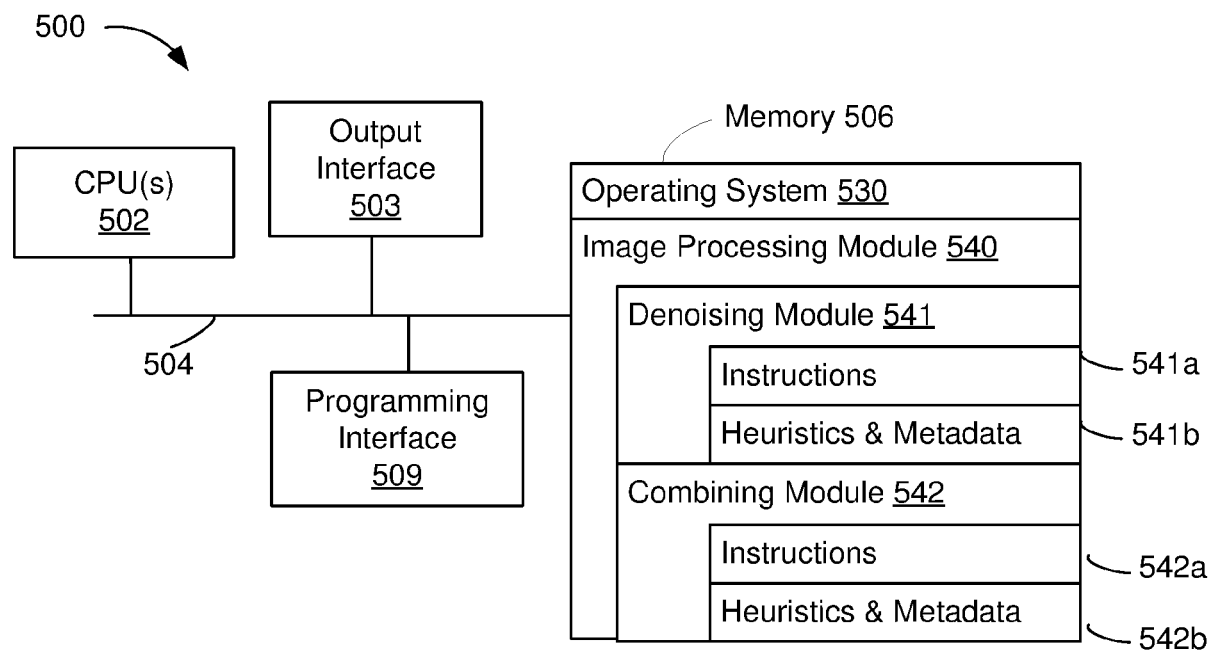
FIG. 5 is a block diagram of a computing device.

FIG. 5 is a block diagram of a computing device 500 in accordance with some implementations. In some implementations, the computing device 500 corresponds to at least a portion of the first HDR image generator 100 of FIG. 1, the second HDR image generator 200 of FIG. 2, or the third HDR image generator of FIG. 3 and performs one or more of the functionalities described above with respect to those devices. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the computing device 500 includes one or more processing units (CPUs) 502 (e.g., processors), one or more input/output interfaces 503 (e.g., a network interface and/or a sensor interface), a memory 506, a programming interface 509, and one or more communication buses 504 for interconnecting these and various other components.

In some implementations, the one or more communication buses 504 include circuitry that interconnects and controls communications between system components. The memory 506 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 506 optionally includes one or more storage devices remotely located from the one or more CPUs 502. The memory 506 comprises a non-transitory computer readable storage medium. Moreover, in some implementations, the memory 506 or the non-transitory computer readable storage medium of the memory 506 stores the following programs, modules and data structures, or a subset thereof including an optional operating system 530 and an image processing module 540. In some implementations, one or more instructions are included in a combination of logic and non-transitory memory. The operating system 530 includes procedures for handling various basic system services and for performing hardware dependent tasks. In some implementations, the image processing module 540 is configured to generate an HDR image. To that end, the image processing module 540 includes a denoising module 541 and a combining module 542.

In some implementations, the denoising module 541 is configured to generate a plurality of denoised images by denoising an image using a respective plurality of denoisers, wherein the plurality of denoisers includes a first denoiser associated with a first level of exposure and a second denoiser associated with a second level of exposure. To that end, the denoising module 541 includes a set of instructions 541*a* and heuristics and metadata 541*b*. In some implementations, the combining module 542 is configured to generate a combined image by combining the plurality of denoised images. To that end, the combining module 542 includes a set of instructions 542*a* and heuristics and metadata 542*b*.

Although the image processing module 540, the denoising module 541, and the combining module 542 are illustrated as residing on a single computing device 500, it should be understood that in other implementations, any combination of the image processing module 540, the denoising module 541, and the combining module 542 can reside in separate computing devices in various implementations. For example, in some implementations each of the image processing module 540, the denoising module 541, and the combining module 542 reside on a separate computing device or in the cloud.

Moreover, FIG. 5 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another, and may depend in part on the particular combination of hardware, software and/or firmware chosen for a particular implementation.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    obtaining an image;
    generating a plurality of denoised images by denoising the image using a respective plurality of denoisers, wherein the plurality of denoisers includes a first denoiser that applies a first denoising algorithm associated with a first level of exposure and a first level of noise, a second denoiser that applies a second denoising algorithm associated with a second level of exposure, and a third denoiser that applies a third denoising algorithm associated with the first level of exposure and a second level of noise; and
    generating a combined image by combining the plurality of denoised images.

2. The method of claim 1, wherein the image is a frame of video.

3. The method of claim 1, wherein the image includes motion blur.

4. The method of claim 1, wherein the first denoiser includes a first neural network trained on training data including first images having the first level of exposure and noisy versions of the first images and the second denoiser includes a second neural network trained on training data including second images having the second level of exposure and noisy versions of the second images.

5. The method of claim 1, wherein the first denoiser includes a first neural network trained on training data including first images having the first level of exposure and noisy versions of the first images having the first level of noise and the third denoiser includes a second neural network trained on training data including third images having the first level of exposure and noisy versions of the third images having the second level of noise.

6. The method of claim 1, wherein generating the combined image includes performing exposure compensation on the plurality of denoised images.

7. The method of claim 1, wherein generating the combined image includes generating a weighted blend of the plurality of denoised images.

8. The method of claim 1, wherein generating the combined image includes combining the plurality of denoised images and one or more supplemental images.

9. The method of claim 1, wherein the combined image is a high-dynamic range (HDR) image.

10. An electronic device comprising:
    a non-transitory memory; and
    one or more processors configured to:
        obtain an image;

generate a plurality of denoised images by denoising the image using a respective plurality of denoisers, wherein the plurality of denoisers includes a first denoiser that applies a first denoising algorithm associated with a first level of exposure and a first level of noise, a second denoiser that applies a second denoising algorithm associated with a second level of exposure, and a third denoiser that applies a third denoising algorithm associated with the first level of exposure and a second level of noise; and generate a combined image by combining the plurality of denoised images.

11. The electronic device of claim 10, wherein the image is a frame of video.

12. The electronic device of claim 10, wherein the image includes motion blur.

13. The electronic device of claim 10, wherein the first denoiser includes a first neural network trained on training data including first images having the first level of exposure and noisy versions of the first images and the second denoiser includes a second neural network trained on training data including second images having the second level of exposure and noisy versions of the second images.

14. The electronic device of claim 10, wherein the first denoiser includes a first neural network trained on training data including first images having the first level of exposure and noisy versions of the first images having the first level of noise and the third denoiser includes a second neural network trained on training data including third images having the first level of exposure and noisy versions of the third images having the second level of noise.

15. The electronic device of claim 10, wherein the one or more processors are configured to generate the combined image by performing exposure compensation on the plurality of denoised images.

16. The electronic device of claim 10, wherein the one or more processors are configured to generate the combined image by generating a weighted blend of the plurality of denoised images.

17. The electronic device of claim 10, wherein the one or more processors are configured to generate the combined image by combining the plurality of denoised images and one or more supplemental images.

18. A non-transitory computer-readable medium having instructions encoded thereon that, when executed by one or more processors of an electronic device, causes the electronic device to perform a method comprising:

obtaining an image;

generating a plurality of denoised images by denoising the image using a respective plurality of denoisers, wherein the plurality of denoisers includes a first denoiser that applies a first denoising algorithm associated with a first level of exposure and a first level of noise, a second denoiser that applies a second denoising algorithm associated with a second level of exposure, and a third denoiser that applies a third denoising algorithm associated with the first level of exposure and a second level of noise; and generating a combined image by combining the plurality of denoised images.

* * * * *